(12) United States Patent
Shahbaz et al.

(10) Patent No.: US 11,929,897 B2
(45) Date of Patent: *Mar. 12, 2024

(54) HIGHLY-SCALABLE, SOFTWARE-DEFINED, IN-NETWORK MULTICASTING OF LOAD STATISTICS DATA

(71) Applicant: VMware LLC, Palo Alto, CA (US)

(72) Inventors: Muhammad Shahbaz, Santa Clara, CA (US); Mukesh Hira, Palo Alto, CA (US); Lalith Suresh, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 17/510,053

(22) Filed: Oct. 25, 2021

(65) Prior Publication Data

US 2022/0045923 A1 Feb. 10, 2022

Related U.S. Application Data

(63) Continuation of application No. 16/432,477, filed on Jun. 5, 2019, now Pat. No. 11,184,259.

(51) Int. Cl.
*H04L 43/062* (2022.01)
*H04L 45/16* (2022.01)
*H04L 47/125* (2022.01)

(52) U.S. Cl.
CPC ............ *H04L 43/062* (2013.01); *H04L 45/16* (2013.01); *H04L 47/125* (2013.01)

(58) Field of Classification Search
CPC ..... H04L 43/062; H04L 45/16; H04L 47/125; H04L 12/1886; H04L 12/1854
See application file for complete search history.

(56) References Cited

U.S. PATENT DOCUMENTS 9,432,204 B2 8/2016 Shen et al.
10,454,833 B1 10/2019 Bosshart et al.
(Continued)

OTHER PUBLICATIONS

Oteo Mayayo, C., "International Search Report and Written Opinion of the International Searching Authority", International Application No. PCT/US2020/035768, dated Sep. 14, 2020, 11 pages.
(Continued)

*Primary Examiner* — Ricky Q Ngo
*Assistant Examiner* — Kabir U Jahangir
(74) *Attorney, Agent, or Firm* — King Intellectual Asset Management

(57) ABSTRACT

In an embodiment, a computer-implemented method for highly-scalable, in-network multicasting of statistics data is disclosed. In an embodiment, a method comprises: receiving, from an underlay controller, a match-and-action table that is indexed using one or more multicast ("MC") group identifiers and includes one or more special MC headers; detecting a packet carrying statistics data; determining whether the packet includes an MC group identifier; in response to determining that the packet includes the MC group identifier: using the MC group identifier, retrieving a special MC header, of the one or more special MC headers, from the match-and-action table; generating an encapsulated packet by encapsulating the packet with the special MC header; and providing the encapsulated packet to an interface controller for transmitting the encapsulated packet to one or more physical switches.

20 Claims, 4 Drawing Sheets

(56) References Cited

U.S. PATENT DOCUMENTS

| | | | |
|---|---|---|---|
| 10,542,078 B1 | 1/2020 | Farrugia et al. | |
| 2013/0094506 A1* | 4/2013 | Song | H04L 45/16 |
| | | | 370/390 |
| 2013/0272133 A1 | 10/2013 | Yalagandula et al. | |
| 2014/0071987 A1* | 3/2014 | Janardhanan | H04L 45/16 |
| | | | 370/390 |
| 2015/0169345 A1 | 6/2015 | DeCusatis et al. | |
| 2016/0006646 A1* | 1/2016 | Lin | H04L 12/6418 |
| | | | 370/390 |
| 2016/0226753 A1 | 8/2016 | Young et al. | |
| 2016/0285744 A1* | 9/2016 | Panchagnula | H04L 12/18 |
| 2017/0163598 A1* | 6/2017 | Shen | H04L 45/74 |
| 2019/0036771 A1 | 1/2019 | Sharpless et al. | |
| 2020/0245206 A1* | 7/2020 | Allan | H04L 45/04 |

OTHER PUBLICATIONS

Shahbaz, M. et al., "Elmo: Source-Routed Multicast for Cloud Services", Feb. 27, 2018, pp. 1-14.

* cited by examiner

| 21 Underlay Controller | 160 Hypervisor | 212 Physical Switch |
|---|---|---|
| • Receive Join Group and/or Leave Group Requests<br>• Based on the Requests, Generate a Match-Action Table that Includes MC Group IDs and Corresponding Special MC Headers<br>• Send the Table to Hypervisors<br>• Send the Table to Physical Switches | • Receive and Store the Match-Action Table that includes the Special MC Headers<br>• Receive an MC Packet<br>• Determine an MC Group Identifier for the Packet<br>• Based on the MC Group Identifier, Determine a Special MC Header for the Packet<br>• Encapsulate the Packet with the Special MC Header<br>• Provide the Packet to a NIC | • Detect the Packet<br>• Determine if the Packet includes a Special MC Header, and if Does, Use a Bitmap in the Special MC Header to Relay the Packet |

FIG. 3

HIGHLY-SCALABLE, SOFTWARE-DEFINED, IN-NETWORK MULTICASTING OF LOAD STATISTICS DATA

CROSS-REFERENCE TO RELATED APPLICATION

This application is a continuation of U.S. patent application Ser. No. 16/432,477, filed Jun. 5, 2019, entitled "Highly-Scalable, Software-Defined, In-Network Multicasting of Load Statistics Data", the entirety of which is hereby incorporated by reference herein.

BACKGROUND

Datacenter applications frequently exhibit one-to-many communications patterns and often require the computer-network-fabric to provide high throughput with a minimal time latency. These requirements usually can be met by conventional IP multicast networks. However, the conventional IP multicast solutions usually suffer from scalability limitations, and thus cannot support IP multicast traffic between, for example, hundreds of thousands of tenants. But, since typical cloud network environments these days need to support hundreds of thousands of tenants, to satisfy that requirement, the IP multicast networks rely on support provided by additional services. Examples of the additional services include overlay multicast solutions, such as overlay IP multicast. However, in a cloud-based datacenter, the overlay IP multicast is not scalable. Other known solutions are usually unicast-based and, therefore, introduce overheads and high latencies that negatively impact the network throughput and CPU utilization.

Implementations of overlay IP multicast solutions in network switches are usually based on IP multicast routing protocols such as the Protocol-Independent Multicast ("PM"), and membership reporting protocols such as the Internet Group Management Protocol ("IGMP"). Implementations of those protocols, however, have many drawbacks. Some of the drawbacks include scalability limitations. The switching chips that implement the multicast protocols can usually support a few thousand of multicast groups, but not hundreds of thousands of multicast groups as required by today's networks. Thus, the switching chips do not scale sufficiently enough to meet the demands of today's multi-tenant cloud environments.

Another drawback of the PIM/IGMP multicast implementations is a control plane churn. The churns are usually caused by significant processing and communications overheads that occur when multicast group members join and leave the multicast groups and the membership data is rapidly updated by the control plane to reflect the migrations of the members. The control plane churn is particularly undesirable when many multicast groups are implemented across a large number of tenants.

There have been some proposals in the research community to encode multicast distribution trees for multicast groups in communications packets. However, those approaches are based on complex encodings such as bloom filters which, unfortunately, introduce significant time latencies.

SUMMARY

In an embodiment, the approach is implemented in software-defined networks ("SDNs"). In an SDN, an underlay-network controller may receive MC group join and leave requests from virtual machine tenants of multicast groups via an application programming interface ("API"). A virtual machine tenant may be an individual who is accessing the SDN system to set up the multicasting environment to enable multicast communications in the SDN network. A request to join an MC group may include, for example, the MC group identifier, network addresses of the recipients of the MC group communications, and the like. Networks usually expose such APIs to the tenants and allow the tenants to request virtual machines, load balancers, firewalls, and other services. Different ways of defining a MC group using the underlay-network controller are described in, for example, the paper entitled "Elmo: Source-Routed Multicast for Cloud Services" by Muhammad Shahbaz et. al, dated Feb. 27, 2018 (citation "arXiv:1802.09815v1") which is incorporated herein by reference in its entirety.

In an embodiment, an underlay-network controller generates and distributes match-action rules and the associated multicast group identifiers to the virtual switches as requested by the virtual machine tenants. The match-action rules are described later. The underlay-network controller may install, in the virtual switches, the corresponding special MC headers to be later encoded in the MC packets. That information, along with the network topology information, may be used by the virtual switches to recognize MC packets in data traffic, and forward the MC packets to the intended recipients. Typically, the underlay-network controller already maintains the information about the network topology, switches, and ports. The underlay-network controller may collect that information by performing various monitoring and management tasks such as the VM placement, load balancing, and others.

In an embodiment, multicast join and leave requests are received by a cloud manager. The cloud manager may receive the request via an API. The cloud providers usually expose such an API to tenants to allow the tenants to request VMs, load balancer services, firewall services, and other services. A multicast group definition may include addresses of tenants' VMs that belong to the MC group. The manager is usually provided with the information about the physical locations of the tenants' VMs, as well as with the information about the current network topology. The manager may be also provided with the information about the capabilities of the switches and unique identifiers of the switches that may be used to address the switches. Based on the received information, the manager computes the MC trees for the MC groups defined by the tenants, and uses the functionalities of a high-level language, such as the P4 language, to program the switches. The manger may also use the functionalities of the P4 Runtime language to control the interfaces of the switches and to install match-action rules in the switches. Once programmed, the switches are enabled to identify MC packets in packet flows, and direct the MC packets to appropriate service VMs, including, for example, load balancer VMs and the like. Later, if the cloud manager is notified about occurrences of certain network events, such as communications link failures or group membership changes, the cloud manager may compute new match-action rules and send the updated match-action rules to the affected switches.

In an embodiment, since the MC membership groups are configured by underlay-network controllers and/or cloud managers, and not by overlay network entities, the process of configuring the MC groups and enabling the routing of MC communications to the members of the MC groups is performed more efficiently and faster than using traditional approaches. For example, since the underlay-network controllers and/or cloud managers are provided with the information about the network topology and the information about the MC groups, they may configure the switches and the special MC headers without generating the MC-related overlay traffic or processing the MC-related overlay traffic. Furthermore, configuring the switches to handle the MC-related traffic involves programing the underlay-network controllers and/or cloud managers with relatively compact program code. This is not achievable using conventional approaches. Moreover, as described below, the presented approach allows including packet forwarding bitmaps in MC packets themselves, and thus eliminates the need for the switches to maintain MC group forwarding tables, which traditionally are large and time-consuming to access.

A virtual machine tenant may use an API to issue requests in which the tenant may specify the groups it wants to join or leave. Upon receiving the requests via the API, an underlay-network controller or a cloud manager may generate the necessary rules and install the rules on the hypervisor switches. Once this is done, the controller/manager may notify the tenant to cause the tenant to start transmitting the MC traffic using its virtual machines.

In an embodiment, a highly scalable, low-latency, in-network multicast approach for encoding multicast trees of multicast groups in headers of communications packets is disclosed. In the approach, multicast ("MC") packets are encapsulated with special MC headers that include MC tree information. The payloads of the MC packets are used to distribute MC data to members of the MC groups. In an embodiment, the payloads of the MC packets are used to distribute load statistics data of virtual machines ("VMs") from, for example, service VMs executing on host computers to load balancers. Based on the received load statistics data, the load balancers determine how to distribute tasks to the service VMs. The load balancers may be implemented in service virtual machines ("SVMs").

The in-network MC approach for encoding MC tree information in special MC headers of MC packets enables the cooperation between an underlay controller, a central control plane, virtual switches and physical switches. While conventionally, a central control plane is used to set up MC groups, in the presented approach, an underlay controller is used to set up the MC groups, including setting up the MC groups for communicating load statistics data. A central control plane is a software program, or a set of programs, that may be configured to, among other things, receive, via an overlay network, multicast group join and leave requests. An underlay controller uses an API to receive, via an underlay network, MC group join and leave requests, and based on the received requests, the underlay controller generates a match-and-action table that includes packets rules to generate special MC headers.

The special MC headers are used by virtual switches implemented in hypervisors to encapsulate the MC packets. A virtual switch is a software program, or set of programs, that allows VMs, containers, or other workloads, to communicate with each other. The virtual switch may be part of a hypervisor, as it is described in detail later. A hypervisor is computer software, firmware or hardware that creates and runs VMs, which may in turn execute a plurality of containers. A computer on which the hypervisor executes the VMs is called a host. The hypervisor provides guest operating systems and virtual operating platforms to the VMs, and manages the execution of the guest operating systems. A physical switch is usually a programmable physical device configured to switch packets in a physical computer network.

In an embodiment, a virtual switch of a hypervisor encapsulates an MC packet with a special MC header that includes MC distribution tree information of the MC group. That information otherwise would have to be stored in advance in each physical switch in the network and for each MC group. However, in the presented approach, the MC tree information is encapsulated inside the packets themselves and distributed by the packets as the packets are routed, and thus, the physical switches do not need to generate and maintain data structures for storing the MC group information for millions of MC groups.

MC tree information may be encoded using bitmaps included in special MC headers included in packets, and physical switches use the bitmaps to switch the packets according to the bitmap information. For example, upon receiving an MC packet that includes a special MC header and an identifier of an MC group, a physical switch uses a bitmap included in the special MC header to determine how to switch the packets to communicate the packet to the members of the MC group.

In an embodiment, upon receiving an MC packet that includes a special MC header, a physical switch parses the special MC header and determines whether an identifier of the switch is included in the MC header. If it is, then the physical switch extracts a corresponding packet rule ("p-rule") from the special MC header, determines the output ports based on the p-rule, and replicates the MC packet on the ports indicated by the p-rule. However, if the switch does not find, in an MC header of the MC packet, a p-rule associated with the switch's identifier, then the switch may rely on so called s-rules.

An s-rule is defined by an underlay controller and provided to a physical switch by the controller. The s-rule indicates the ports implemented on the switch on which the switch should relay a packet that belongs to an MC group. The s-rules are used to provide support for the presented approach when a bitmap itself would be too large to be included in a special MC header as the size of MC headers is usually limited. This may happen when the multicast tree includes a vast number of physical switches and a bitmap that would encode all p-rules for all switches would be too large to be included in a special MC header. Hence, if the switch does not find its own identifier (or a p-rule) in a special MC header of the MC packet, then the switch may perform a lookup in a flow table using an identifier of a tenant and a destination IP address included in the header of the MC packet to access and retrieve the corresponding s-rule. Based on the s-rule, the switch may determine the switch's output ports on which to replicate the MC packet.

BRIEF DESCRIPTION OF THE DRAWINGS

In the drawings:

FIG. 3 is a time chart depicting an example process for a highly-scalable, software-defined, in-network multicasting of load statistics data.

DETAILED DESCRIPTION

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

1. Example Physical Implementations

Figure 1:
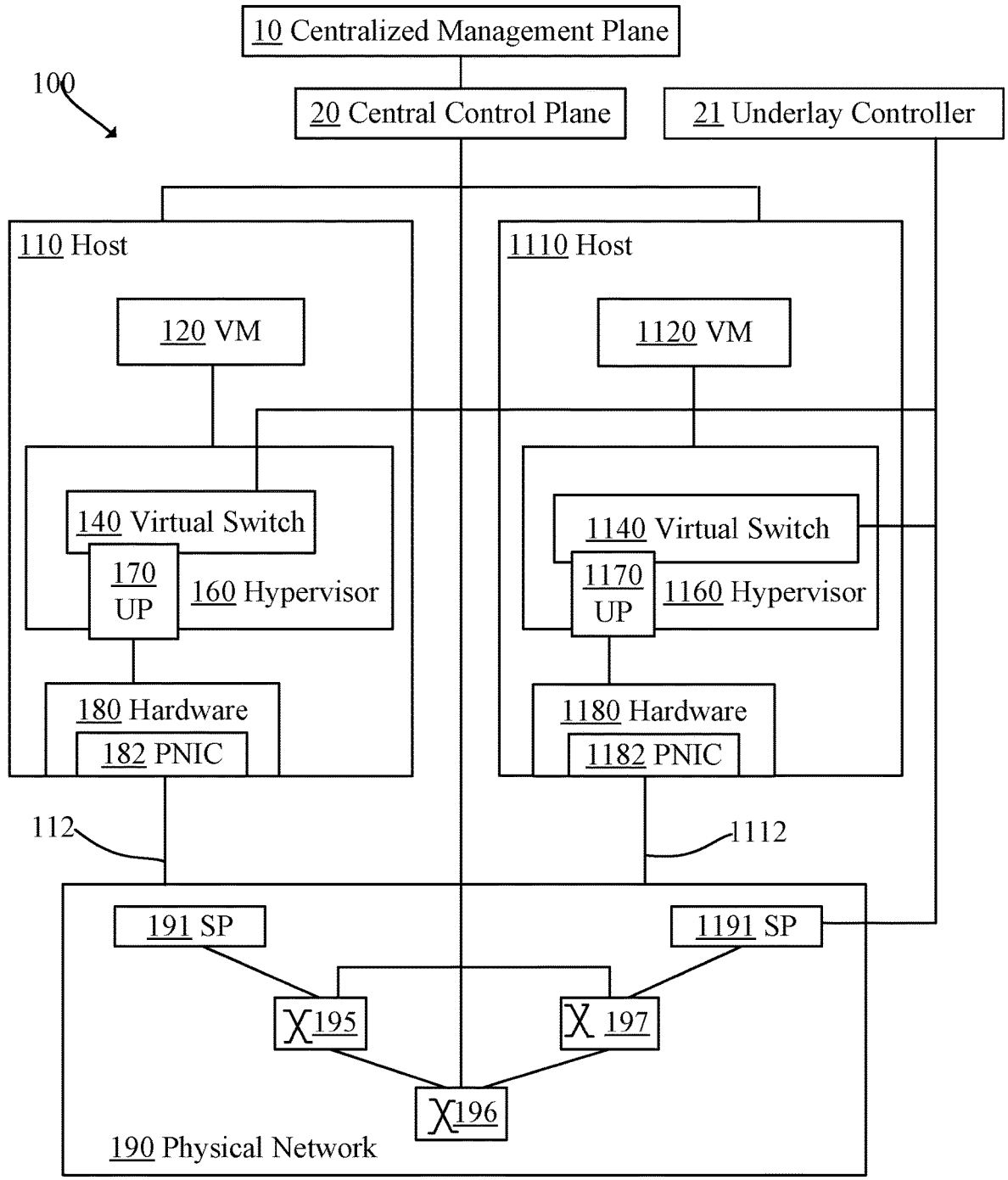
FIG. 1 is a block diagram depicting an example physical implementation view of an example logical network environment for a highly-scalable, software-defined, in-network multicasting of load statistics data.

FIG. 1 is a block diagram depicting an example physical implementation view of an example logical network environment for a highly-scalable, software-defined, in-network multicasting of load statistics data. In the depicted example, environment 100 includes a management plane 10, a central control plane 20 (also referred to as an SDN central control plane 20), an underlay controller 21, a plurality of hosts 110, 1110, and a physical network 190. In an embodiment, management plane 10 and central control plane 20 may be implemented as distributed or clustered systems and may be combined into a single combined management/central controller server or cluster.

Host 110/1110 may include a hypervisor 160/1160, hardware components 180/1180, and other components not depicted in FIG. 1. Hypervisor 160/1160 may be implemented as a software layer that supports execution of multiple virtualized computing instances of virtual machines. Hypervisor 160/1160 may use uplinks 170/1170 to provide connectivity to and from physical network interface controllers ("PNICs") 182/1182, respectively. Hypervisor 160/1160 may include a virtual switch 140/1140 and may provide connectivity to and from one or more virtual machines, including a VM 120/1120. Each VM may itself host multiple endpoints or workloads, such as namespace containers (not shown). Each workload has one or more overlay IP addresses associated with it and is therefore reachable over a logical overlay network.

Hardware components 180/1180 may include hardware processors, memory units, data storage units, and physical network interfaces, some of which are not depicted in FIG. 1. Hardware components 180/1180 may also include PNICs 182/1182, respectively, which may provide connectivity to routers and switches of physical network 190.

Virtual switch 140/1140, or a separate software component (not shown) operating in conjunction therewith, may be configured to monitor and manage data traffic that is communicated to and from hypervisor 160/1160, respectively. Implementations of virtual switch 140/1140 may vary and may depend on a type of product in which the switch is deployed as a virtualization medium. For example, virtual switch 140/1140 may be implemented as part of hypervisor 160/1160, as it is depicted in FIG. 1, and as it is in the vSphere® and KVM® hypervisors. Alternatively, although not depicted in FIG. 1, virtual switch 140/1140 may be implemented as a hardware component, or with hardware assistance, or as part of a user space, or within a privileged virtual machine, often referred to as a Domain Zero or Root Partition. Examples of such architectures include the HyperV® and Xen® hypervisors.

VMs 120 and 1120 may be realized as complete computational environments. VMs 120 and 1120 conceptually contain virtual equivalents of hardware and software components of the physical computing systems. VMs 120 and 1120 may be instantiated as virtualized computing instances. The instances may be equipped with their own resources, may be assigned their own workloads, and may be configured to perform their own tasks assigned to the workloads. Virtual resources associated with VMs 120 and 1120 may include virtual CPUs, virtual memory, virtual disks, virtual network interface controllers and the like. VMs 120 and 1120 may be configured to execute guest operating systems and guest applications.

Physical network 190 may include local area networks and/or wide area networks and may utilize various hardware and software configurations. For example, physical network 190 may include one or more routers (not shown), one or more switches 195, 196 and 197, and one or more switch ports 191, 1191. Physical switches 195, 196 and 197 may be programmable physical switches, and thus may be configured to receive and store s-rules, parse special MC headers, and determine, based on the special MC headers and s-rules whether and how to relay the MC packets on ports of the physical switches.

1.1. Management Plane

Management plane 10 is a software application, or a set of applications, which, when executed, is used to manage and monitor network services configured on entities of the overlay network. Management plane 10 may be configured to, for example, receive conventional configuration requests from MC group members, and process the requests to generate configuration instructions. A request for a VM on a logical overlay network multicast group may require joining the host, and more precisely, the tunnel endpoint of the host on which the VM runs, to join a corresponding underlay network multicast group. Details of this relationship are described by way of example in U.S. Pat. No. 9,432,204, invented by Jianjun Shen, et al. and granted Aug. 30, 2016, and which is incorporated herein by reference in its entirety. Management plane 10 may also be configured to send the configuration instructions to central control plane 20 to instruct plane 20 to generate, based on the instructions, MC membership groups, and implement the MC groups on host computers 110 and 1110.

1.2. Central Control Plane

Central control plane 20 is a software application, or a set of software applications, which, when executed, is used to receive configuration files and instructions from management plane 10 and use the received data to configure and control entities in the network.

1.3. Underlay Controller

Underlay controller 21 is a software application, or a set of software applications, which, when executed, is used to create and modify MC groups and provide information to virtual switches to facilitate communications between members of the MC groups. Underlay controller 21 may receive MC group join and leave requests from virtual machine tenants of MC groups via an API. A request to join an MC group may include, for example, the MC group identifier, network addresses of the recipients of the MC group communications, and the like. The APIs may be used to allow the tenants to request virtual machines, load balancers, firewalls, and other services. Upon receiving the request, underlay controller 21 may include the requestor in the MC group. Using the topology information, underlay controller 21 may also determine information for routing packets to the members of the MC group. Furthermore, underlay controller 21 may generate rule configuration instructions, and generate a match-and-action table, p-rules and s-rules. Underlay controller 21 may transmit the match-and-action table to virtual switches 140 and 1140 to request implementing the tables and rules on the hosts. Furthermore, underlay controller 21 may transmit the s-rules to physical switches 191, 195, 196, 197 and 1191 implemented in physical network 190 via connections 112 and 1112, respectively.

2. Example Arrangement of Physical Switches

Figures 2A, 2B:
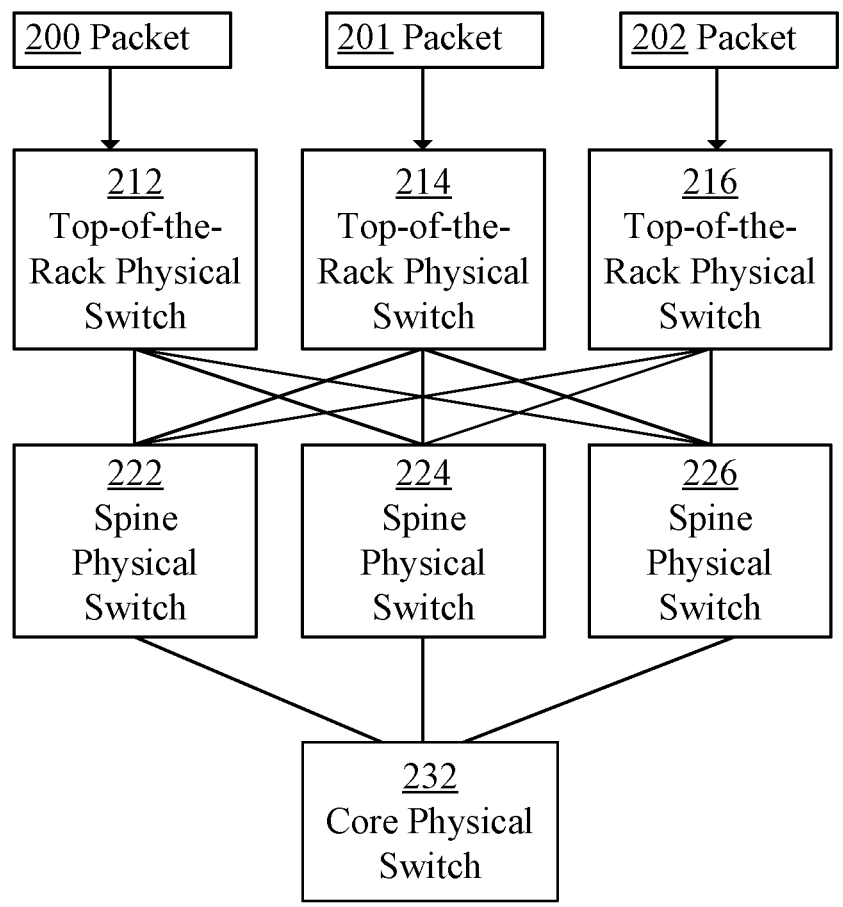
FIG. 2A is a block diagram depicting an example arrangement of physical switches.
FIG. 2B is a block diagram depicting an example special MC header.

FIG. 2A is a block diagram depicting an example arrangement of physical switches. The depicted arrangement includes one or more top-of-the rack ("TOR") physical switches 212, 214, and 216, one or more spine physical switches 222, 223 and 226, and a core physical switch 232. Spine physical switches 222, 223 and 226 may have multiple layers of spine switches. Spine switches 222, 223 and 226 may be connected to core switch 232 via ports (not shown).

In an embodiment, TOR physical switches 212, 214, and 216 detect packets, such as packets 200, 201, and 202, parse the detected packets to determine output ports—if any, and replicate the received packets on the determined output ports so that spine physical switches 222, 224 and/or 226 may detect the packets.

3. Multicasting Load Statistics Data

In an embodiment, a highly-scalable, in-network multicasting approach is used by computer hosts to multicast load statistics of VMs to load balancers (not shown). The load statistics of the VMs may include CPU utilization by the VMs. Based on the received load statistics, the load balancers may determine to which VMs the traffic should be directed. The load balancers may be implemented in SVMs or other service devices.

In an embodiment, agent software modules (not shown in FIG. 1) implemented in hosts 110 and 1110 receive load statistics of VM 120 and 1120 from hypervisors 160 and 1160 as hypervisors 160 and 1160 usually have the load statistics available. The agents generate MC packets, include the load statistics in payloads of the packets, include an MC group identifier of the load balancer MC group in headers of the packets, and multicast the packets to load balancers.

4. Handling Special Mc Headers by Physical Switches

In an embodiment, a packet comprises a VXLAN header followed by a special MC header. The special MC header is used to program a physical switch to handle MC packets. The special MC header includes the MC distribution tree information that otherwise would have to be provided to each of the physical switches and stored by each of the switches.

Upon detecting a packet having a special MC header, a physical switch determines whether its own identifier is included in the special MC header. If the switch identifier is included in the special MC header, then the switch retrieves, from the special MC header, a bitmap row associated with the switch identifier, and replicates the packet on the ports that are marked with "1" in the bitmap row. But, if the switch identifier of the switch is not included in the special MC header, then the switch may use s-rules, as described above.

FIG. 2B is a block diagram depicting an example special MC header 250. A special MC header of an MC packet may include identifiers 252 of physical switches and a bitmap 254. A bitmap row of bitmap 254 is associated with an identifier of identifiers 252. Bitmap 245 encodes an MC tree for an MC group by indicating, to the physical switches, the ports on which the physical switches should relay the MC packet so that the packet can reach the members of the MC groups.

In an embodiment, a row of bitmap 254 corresponds to a p-rule. A p-rule indicates the ports implemented on a physical switch and on which the switch should relay the packet. For a given identifier of identifiers 252, bitmap 254 includes a row of binary data that indicates on which ports, if any, the corresponding physical switch needs to place a received MC packet. In an embodiment, "1" in $n^{th}$ bit in a row of bitmap 254 that corresponds to a particular physical switch indicates that the particular switch should replicate the received MC packet on its $n^{th}$ output port to relay the packet, while "0" in $m^{th}$ bit in a row of bitmap 254 that corresponds to a particular physical switch indicates that the particular switch should not replicate the received MC packet on its $m^{th}$ output port.

Typically, a switch identifier is assigned to one individual physical switch, and thus a bitmap row corresponding to the physical switch includes instructions for all ports of the switch.

In other implementations, one switch identifier may be assigned to a plurality of physical switches. If a switch identifier is assigned to a plurality of physical switches, then upon receiving an MC packet having a special MC header that includes such an identifier, the switch switches the packet to the plurality of switches, and the switches in the plurality of switches use their own s-rules to determine whether they need to relay the MC packet on their ports.

If a physical switch is a Layer 2 ("L2") programmable switch, then the switch can use the disclosed approach. A programmable L2 switch is configured to parse an Ethernet header of a detected packet and determine whether the Ethernet header has a certain flag set to indicate that the packet includes a special MC header. If that flag is set, then the switch accesses and extracts a special MC header and uses the special MC header to determine how to replicate the detected packet.

If a physical switch is a legacy switch, then the switch is not configured to identify special MC headers in detected packets. A legacy switch may ignore the special MC headers and relies on its MC group table. Since the legacy switches may maintain relatively small MC tables, the legacy switches cause bottlenecks in implementing the high scalability multicasting.

5. Highly-Scalable, Software-Defined, In-Network Multicasting

FIG. 3 is a time chart depicting an example process for a highly-scalable, software-defined, in-network multicasting of load statistics data. The processing is performed by underlay controller 21, hypervisor 160/1160, and physical switch 212/214/216/222/224/226/232.

5.1. Processing Performed by an Underlay Controller

In an embodiment, underlay controller 21 receives multicast group join and leave requests from potential and present members of MC groups. Based on the request, underlay controller 21 may generate a match-and-action table that can be indexed using MC group identifiers and include special MC headers containing p-rules. The members of the MC groups may include load balancers that want to receive load statistics of VMs. Underlay controller 21 may send the match-and-action tables with the special MC headers to hypervisors.

In an embodiment, underlay controller 21 generates s-rules and transmits them to virtual switches 140 and 1140, and physical switches 212, 214, 216, 222, 224, 226, and 232.

5.2. Processing Performed by a Hypervisor

Figure 4:
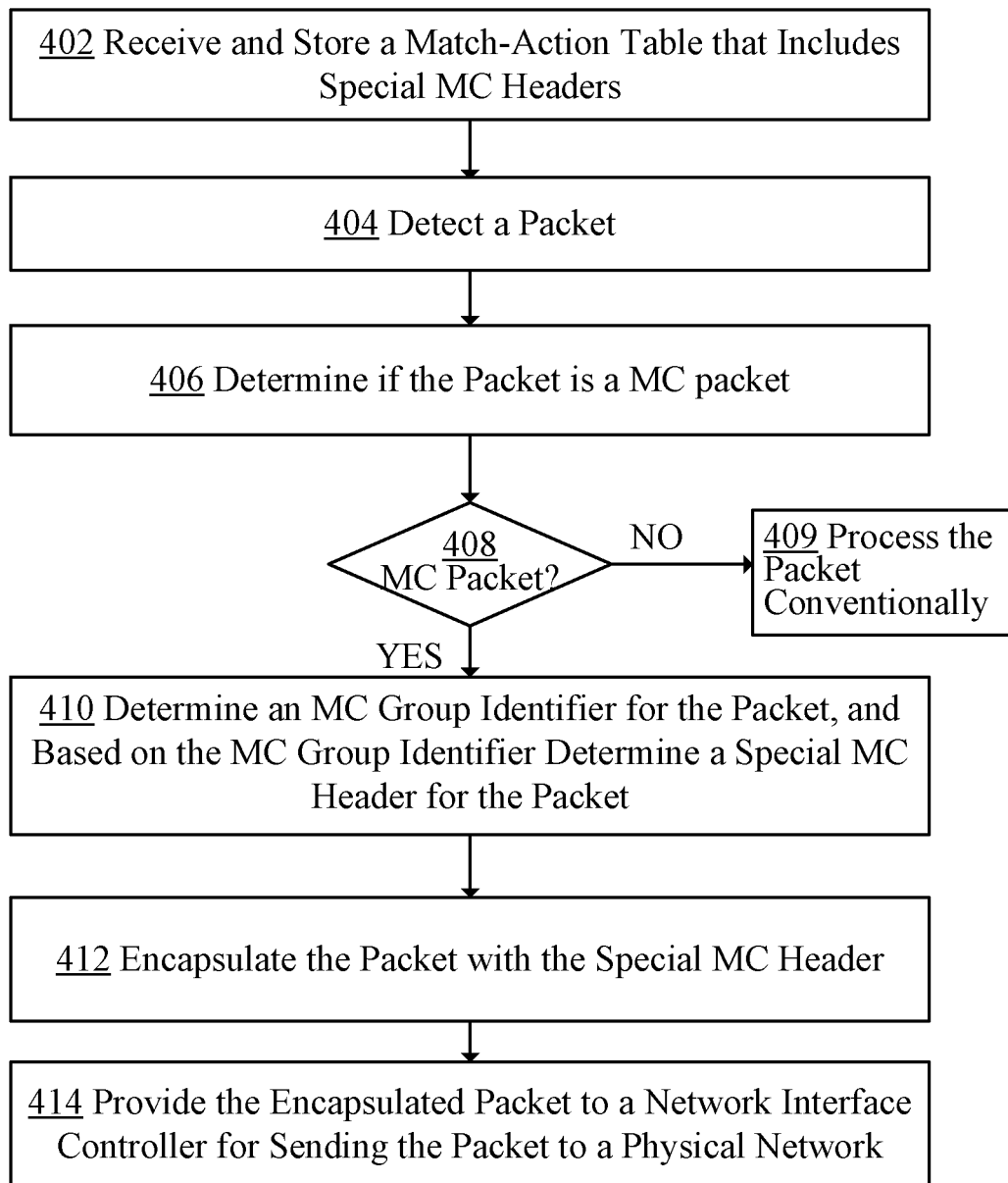
FIG. 4 is an example flow chart for a highly-scalable, software-defined, in-network multicasting of load statistics data.

FIG. 4 is an example flow chart for a highly-scalable, software-defined, in-network multicasting of load statistics data. The steps described in FIG. 4 may be performed by a hypervisor, such as hypervisor 160/1160.

In step 402, a hypervisor receives and stores a match-and-action table that includes special MC headers.

In step 404, the hypervisor detects a packet. Upon detecting the packet, the hypervisor determines whether the packet is an MC packet. For example, the hypervisor may parse the packet header, and determine whether the header includes an MC group identifier. If, in step 408, the hypervisor determines that the packet is an MC packet, then the hypervisor proceeds to step 410; otherwise, the hypervisor proceeds to step 409, in which the hypervisor processes the packet conventionally.

In step 410, upon determining that the packet is an MC packet, the hypervisor or a virtual switch implemented in the hypervisor, uses the MC group identifier to retrieve a special MC header from the match-and-action table. The special MC header includes p-rules, which include identifiers of physical switches and bitmap rows associated with the identifiers.

In step 412, the hypervisor, or the virtual switch of the hypervisor, encapsulates the MC packet with the special MC header.

In step 414, the hypervisor provides the encapsulated packet to a network interface controller ("NIC") to allow the NIC to send the packet to physical network 190. Hence, the special MC header is prepended to a packet before the NIC encapsulates the packet with additional headers to facilitate sending the packet to network 190.

5.3. Processing Performed by a Physical Switch

Referring again to FIG. 3, upon detecting an MC packet, a programmable physical switch parses an Ethernet header of the packet to determine whether a special MC header is included in the packet. If it is included, then the physical switch extracts the special MC header and determines whether the header includes an identifier of the switch and a p-rule that applies to the switch.

If the switch determines that the special MC header includes an identifier of the switch and a p-rule that applies to the switch, then the switch uses the p-rule to determine the ports on which the switch should replicate the packet, and thus relay the packet.

If the physical switch determines that the special MC header does not include an identifier of the switch, then the switch drops the packet, or uses an s-rule, as described above.

6. Improvements Provided by Certain Embodiments

In an embodiment, an in-network multicasting of load statistics data provides high scalability for multicasting because it provides the MC tree information to physical switches in MC packets themselves. This relieves the physical switches from a need to maintain huge MC tables which typically are still too small to handle hundreds of thousands of MC tenants.

Including MC tree information in special MC headers and adding the MC headers to MC packets is less burdensome than having physical switches to maintain the huge MC tables. For example, in a datacenter topology that includes 27K hosts, the datacenter implementing the presented approach by using the special 325-byte-long MC headers added to MC packets may support a million of MC groups while requiring only about 1.1K multicast entries in flow tables maintained by the physical switches.

In an embodiment, the presented approach solves the multicasting problem in today's datacenters which often support a vast number of multicast groups. Since typical physical switches do not have enough memory for maintaining such MC tables, without the presented approach, the physical switches could not handle the multicasting in today's datacenters.

7. Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus and used for storing information and software instructions to be executed by a processor. Main memory may also be used for storing temporary variables or other intermediate information during execution of software instructions to be executed by one or more processors.

8. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

What is claimed is:

1. A computer-implemented method for highly-scalable, in-network multicasting of load statistics data, the method comprising:

receiving, at a physical switch, a packet comprising statistics data for virtual machines executing on a host, the statistics data being associated with a multicast ("MC") group;

performing multicast distribution of packets, the performing comprising:

determining that the packet comprises a special header corresponding to the MC group;

determining that the special header includes an identifier of the physical switch;

identifying a bitmap associated with the identifier of the physical switch; and using the bitmap, determining one or more ports of the physical switch to replicate the packet on; and providing the packet to an interface controller for transmitting the packet to the port of the physical switch; and balancing a service load across a set of servers using a plurality of load balancers by sending multicast packets to the plurality of load balancers via the physical switch by including the special header, the multicast packets including load statistics data of the set of servers.

2. The computer-implemented method of claim 1, further comprising: in response to determining one or more output ports of the physical switch on which to replicate the encapsulated packet, causing the physical switch to replicate the encapsulated packet on the one or more output ports.

3. The computer-implemented method of claim 1, wherein the statistics data is load statistics data comprising CPU utilization by the virtual machines.

4. The computer-implemented method of claim 1, wherein a bitmap row of the bitmap associated with the identifier of the physical switch includes one or more bits;
wherein $n^{th}$ bit of the one or more bits corresponds to $n^{th}$ output port of the physical switch; and wherein $n^{th}$ bit of the one or more bits indicates whether the packet is to be replicated by the physical switch on $n^{th}$ output port of the physical switch.

5. The computer-implemented method of claim 1, wherein at least one of the plurality of load balancers:
receiving a multicast packet replica comprising load statistics data of the set of servers,
receiving a task; and
distributing the task to a server in the set of servers based at least in part on the load statistics data.

6. The computer-implemented method of claim 1, wherein the plurality of load balancers are implemented in service virtual machines; and wherein the statistics data indicates CPU utilization of one or more virtual machines to determine to which virtual machines traffic should be directed.

7. The computer-implemented method of claim 1, further comprising using an underlay controller, programming a set of switches in a network to perform multicast distribution of packets.

8. A method for balancing a service load across a set of servers using a plurality of load balancers, the method comprising:
using an underlay controller, programming a set of switches in a network to perform multicast distribution of packets by:
determining that a packet comprises a special header corresponding to a multicast ("MC") group;
determining that the special header includes an identifier of a switch in the set of switches;
identifying a bitmap associated with the identifier of the switch; and
using the bitmap, determining one or more ports of the switch to replicate the packet on;
using agents, sending multicast packets to the plurality of load balancers via the set of switches by including the special header, the multicast packets including load statistics data of the set of servers;
at least one of the plurality of load balancers:
receiving a multicast packet replica comprising load statistics data of the set of servers,
receiving a task; and
distributing the task to one of the servers based at least in part on the load statistics data.

9. The method of claim 8, further comprising causing the switch to detect the packet that includes the special header.

10. The method of claim 8, further comprising, in response to determining one or more ports of the switch on which to replicate the packet, causing the switch to replicate the packet on the one or more ports.

11. The method of claim 8, in response to determining that a second special header of a second packet does not include a second identifier of a second switch, causing the second switch to lookup a flow table using a tenant identifier and a destination IP address included in the second special header to access and retrieve an s-rule, and use the s-rule to determine whether to replicate the second packet on any output port of the second switch.

12. The method of claim 11, wherein a bitmap row of the bitmap associated with the identifier of the switch includes one or more bits;
wherein $n^{th}$ bit of the one or more bits corresponds to $n^{th}$ output port of the switch; and
wherein $n^{th}$ bit of the one or more bits indicates whether the packet is to be replicated by the switch on $n^{th}$ output port of the switch.

13. The method of claim 9, further comprising accessing a match-and-action table that is indexed using one or more multicast ("MC") group identifiers and includes one or more special headers, the match-and-action table comprising one or more packet rules ("p-rules");
wherein a p-rule of the one or more p-rules indicates one or more output ports implemented on the switch on which the switch is to relay the packet; and wherein the one or more p-rules are generated by the underlay controller based on join-group-requests and leave-group-requests.

14. The method of claim 9, wherein the load balancers are implemented in service virtual machines.

15. A system comprising:
a network;
a set of switches;
a set of servers;
a plurality of agents; and
an underlay controller that programs the set of switches in the network to perform multicast distribution of packets by:
determining that a packet comprises a special header corresponding to a multicast ("MC") group;
determining that the special header includes an identifier of a switch in the set of switches;
identifying a bitmap associated with the identifier of the switch; and
using the bitmap, determining one or more ports of the switch to replicate the packet on;
the plurality of agents sending MC packets to the plurality of load balancers via the set of switches by including the special header, the multicast packets including load statistics data of the set of servers;
at least one of the plurality of load balancers:
receiving a multicast packet replica comprising load statistics data of the set of servers,
receiving a task; and
distributing the task to one of the servers based at least in part on the load statistics data.

16. The system of claim 15, wherein the switch detects the packet that includes the special header.

17. The system of claim 15, in response to determining one or more ports of the switch on which to replicate the packet, the switch replicates the packet on the one or more ports.

18. The system of claim 15, wherein a bitmap row of the bitmap associated, in the special header, with the identifier of the switch includes one or more bits;
- wherein $n^{th}$ bit of the one or more bits corresponds to $n^{th}$ output port of the switch; and
- wherein $n^{th}$ bit of the one or more bits indicates whether the packet is to be replicated by the switch on $n^{th}$ output port of the switch.

19. The system of claim 15, further comprising a memory storing a match-and-action table that is indexed using one or more multicast ("MC") group identifiers and includes one or more special headers, the match-and-action table comprising one or more packet rules ("p-rules");
- wherein a p-rule of the one or more p-rules indicates one or more output ports implemented on the switch on which the switch is to relay the packet; and
- wherein the one or more p-rules are generated by the underlay controller based on join-group-requests and leave-group-requests.

20. The system of claim 15, wherein the load balancers are implemented in service virtual machines.

* * * * *